US011644954B2

(12) United States Patent
Lee et al.

(10) Patent No.: US 11,644,954 B2
(45) Date of Patent: May 9, 2023

(54) METHOD AND APPARATUS FOR PROVIDING A DOCUMENT EDITING INTERFACE FOR PROVIDING RESOURCE INFORMATION RELATED TO A DOCUMENT USING A BACKLINK BUTTON

(71) Applicant: Business Canvas Inc., Seoul (KR)

(72) Inventors: Seungmin Lee, Seoul (KR); Woojin Kim, Seoul (KR)

(73) Assignee: Business Canvas Inc., Seoul (KR)

( * ) Notice: Subject to any disclaimer, the term of this patent is extended or adjusted under 35 U.S.C. 154(b) by 0 days.

(21) Appl. No.: 17/845,088

(22) Filed: Jun. 21, 2022

(65) Prior Publication Data

US 2023/0012509 A1 Jan. 19, 2023

(30) Foreign Application Priority Data

Jul. 16, 2021 (KR) .......................... 10-2021-0093226

(51) Int. Cl.
*G06F 3/0482* (2013.01)
*G06F 40/166* (2020.01)

(52) U.S. Cl.
CPC .......... *G06F 3/0482* (2013.01); *G06F 40/166* (2020.01); *G06F 2203/04803* (2013.01)

(58) Field of Classification Search
CPC ................. G06F 3/0482; G06F 40/166; G06F 2203/04803
See application file for complete search history.

(56) References Cited

U.S. PATENT DOCUMENTS

| 6,081,814 | A | * | 6/2000 | Mangat | G06F 16/958 |
| | | | | | 707/999.1 |
| 9,465,784 | B1 | * | 10/2016 | Hagopian | G06F 40/166 |
| 2007/0136318 | A1 | * | 6/2007 | Clark | G06F 16/951 |
| | | | | | 715/236 |
| 2012/0215864 | A1 | * | 8/2012 | Fukuoka | G06Q 10/10 |
| | | | | | 709/206 |
| 2012/0290433 | A1 | | 11/2012 | England et al. | |
| 2012/0290436 | A1 | | 11/2012 | Frost et al. | |
| 2014/0173426 | A1 | * | 6/2014 | Huang | G06F 40/166 |
| | | | | | 715/256 |

(Continued)

FOREIGN PATENT DOCUMENTS

| KR | 10-2001-0107807 A | 12/2001 |
| KR | 10-2009-0061664 A | 6/2009 |

(Continued)

OTHER PUBLICATIONS

Korean Patent Office Decision to Grant for KR 10-2021-0093226 dated Feb. 25, 2022.
Korean Office Action for KR 10-2021-0093226 dated Sep. 28, 2021.

*Primary Examiner* — Dino Kujundzic
(74) *Attorney, Agent, or Firm* — Sughrue Mion, PLLC

(57) ABSTRACT

A document editing interface providing method for providing resource information associated with a document on a display of a user device using a backlink button through a processing module is disclosed. The method contains a workspace screen display step, a backlink button display step, a selected document display step, and a library panel display step. Also disclosed are a document editing interface providing apparatus or server for providing resource information associated with a document on a display of a user device using a backlink button.

8 Claims, 11 Drawing Sheets

(56) References Cited

U.S. PATENT DOCUMENTS

| | | |
|---|---|---|
| 2014/0189818 A1 | 7/2014 | Meyer |
| 2014/0344718 A1 | 11/2014 | Rapaport et al. |
| 2015/0066996 A1* | 3/2015 | Bai .................. G06F 16/31 |
| | | 707/811 |
| 2016/0210268 A1* | 7/2016 | Sales ............... G06F 3/04842 |

FOREIGN PATENT DOCUMENTS

| | | |
|---|---|---|
| KR | 10-2017-0103997 A | 9/2017 |
| KR | 10-2019-0100177 A | 8/2019 |

* cited by examiner

METHOD AND APPARATUS FOR PROVIDING A DOCUMENT EDITING INTERFACE FOR PROVIDING RESOURCE INFORMATION RELATED TO A DOCUMENT USING A BACKLINK BUTTON

CROSS-REFERENCE TO RELATED APPLICATION

This application claims the benefit of Korean Patent Application No. 10-2021-0093226, filed on Jul. 16, 2021 in the Korean Intellectual Property Office, the disclosure of which is incorporated herein by reference.

TECHNICAL FIELD

The present invention relates to a method and apparatus for providing a document editing interface for providing resource information related to a document using a backlink button, more specifically, an invention relating to a technology for providing a document editing interface capable of efficiently managing a resource by collecting, classifying and structuring the resource used in document editing.

BACKGROUND

The modern society has entered a data-rich era due to the popularization of the internet, and this change in trends is creating various phenomena in each level of the society. One of the phenomena based thereon may be information access through web search. Web search may be performed by anyone on the net or in a location on which resources are stored, which makes it easier to access specific information.

Particularly, in the case of electronic document work centrally performed in fields, such as knowledge labor, it is known that knowledge workers spend an average of 2.5 hours per day in searching for resources and information based on the gradual increase in data-centric document work.

However, since it is impossible to clarify and intuitively set the relationship between resources based on the structure of the current folder system of storing the generated or downloaded resources by determining a storage location for the collected resources, resources are not being efficiently managed considering its type and quantity.

The biggest cause of this problem is that a writer that has downloaded a resource through a search or has generated a resource relies only on the writer's memory to determine the source of the resource when the writer wishes to reuse the resource.

Accordingly, resource management is not efficiently performed, for example, a resource that was used may be searched again or multiple versions of the same document may be generated because the source of the resource is not accurately remembered, and thus, a lot of time and cost is overlappingly consumed in editing and generating documents.

SUMMARY OF INVENTION

Technical Objects

Accordingly, the method and apparatus for providing a document editing interface for providing resource information related to a document using a backlink button according to an embodiment is an invention devised to solve the aforementioned problem, and is for providing a document editing interface that allows a user to more efficiently manage and use resources by intuitively displaying resources associated with the document.

More specifically, the invention has an object of allowing the user to efficiently perform resource management in addition to document editing by intuitively displaying a resource associated with a document using a panel and, at the same time, providing a backlink system for clearly identifying the original source of the resource, thereby allowing the user to intuitively ascertain the relationship between the document and the resource.

A document editing interface providing method for providing resource information associated with a document on a display of a user device using a backlink button through a processing module, the method comprising a workspace screen display step of, when a user executes a first document on which a resource statement is to be changed, displaying, on a display of the user device, a workspace screen comprising a first document editing panel on which the processing module may edit the first document, a first resource panel on which a first resource associated with the first document is displayed, and a second resource panel on which a second document selected according to the first document and a preset rule and a second resource associated with the second document are displayed, a backlink button display step of, when there is a selected resource from the second resource that has been selected by the user and moved to a first resource panel, displaying, on the first resource panel, a backlink button on which the processing module may view information on the selected resource and the selected document associated with the selected resource and a selected document display step of, when the user has executed the backlink button, the processing module displaying, on the first resource panel along with the backlink button, a selected document button comprising a title of the selected document.

The document editing interface providing method for providing resource information associated with a document using a backlink button may further comprise a library panel display step of, when the user has commanded the execution of the selected document button through the user device, the processing module displaying, on the workspace screen, a library panel on which a library list, which is a resource list included in the selected document is displayed.

The document editing interface providing method for providing resource information associated with a document using a backlink button may further comprise a second document editing panel display step of, when the user has executed a specific resource from the first resource, the second resource or resources included on the library list, the processing module generating a second document editing panel on which contents included in the specific resource are displayed, and displaying the second document editing panel on the workspace screen.

The second document editing panel display step may comprise partially reducing a size of the first document editing panel and displaying, as a panel in the form of a split viewer, the second document editing panel in the remaining space.

The workspace screen display step may further comprise the processing module displaying, on the workspace screen, an inbox panel; and wherein the inbox panel display step comprises, even when an execution of the first document has ended, or a new document is executed, continually displaying, on the workspace screen, the inbox panel and an inbox resource, which is a resource displayed on the inbox panel, without being changed.

The second document selected according to the preset rule may be at least one document selected from a document associated with a resource that is identical to the first resource, a document that was previously edited by the user and a document stored in the same folder as the first document.

The backlink button display step comprises, when the selected resource corresponds to a resource document, which is a document, displaying, on the first resource panel, the selected resource as a button in the form of a card, and further comprises, when the user has commanded the execution of the button in the form of a card, generating a third document editing panel on which the contents of the resource document may be edited and displaying the third document editing panel on the workspace screen.

A document editing interface providing apparatus for providing resource information associated with a document using a backlink button, the apparatus comprise a screen display module of, when a user executes a first document on which a resource statement is to be changed, displaying a workspace screen comprising a first document editing panel on which the first document may be edited, a first resource panel on which a first resource associated with the first document is displayed, and a second resource panel on which a second document selected according to the first document and a preset rule and a second resource associated with the second document are displayed and a backlink display module of, when there is a selected resource from the second resource that has been selected by the user and moved to a first resource panel, displaying, on the first resource panel, a backlink button on which information on the selected resource and a selected document associated with the selected resource may be viewed; and when the user has input an execution of the backlink button, displaying, on the first resource panel, a selected document button including the selected document along with the backlink button.

A document editing interface providing server for providing resource information associated with a document using a backlink button, the server may comprise a screen display module of, when a user executes a first document on which a resource statement is to be changed, displaying a workspace screen comprising a first document editing panel on which the first document may be edited, a first resource panel on which a first resource associated with the first document is displayed, and a second resource panel on which a second document selected according to the first document and a preset rule and a second resource associated with the second document are displayed and a backlink display module of, when there is a selected resource from the second resource that has been selected by the user and moved to a first resource panel, displaying, on the first resource panel, a backlink button on which information on the selected resource and a selected document associated with the selected resource may be viewed; and when the user has input an execution of the backlink button, displaying, on the first resource panel, a selected document button including the selected document along with the backlink button.

Effects of the Invention

The method and apparatus for providing a document editing interface for providing resource information related to a document using a backlink button according to an embodiment provides an interface that allows the user to intuitively ascertain the relationship between the resource and the document associated with the resource. Thus, the user is able to more clearly ascertain the relationship between the resource and the document, thereby having the advantage of efficiently performing resource and document management.

Furthermore, the user is able to intuitively ascertain the source of a resource through a backlink system through which the original source of a resource is clearly identified, and at the same time, information related to a document associated with the resource may be easily obtained, thereby achieving the effect of reducing time and cost for the user to ascertain the source of a resource and editing a document.

DETAILED DESCRIPTION OF EMBODIMENTS

Figure 1:
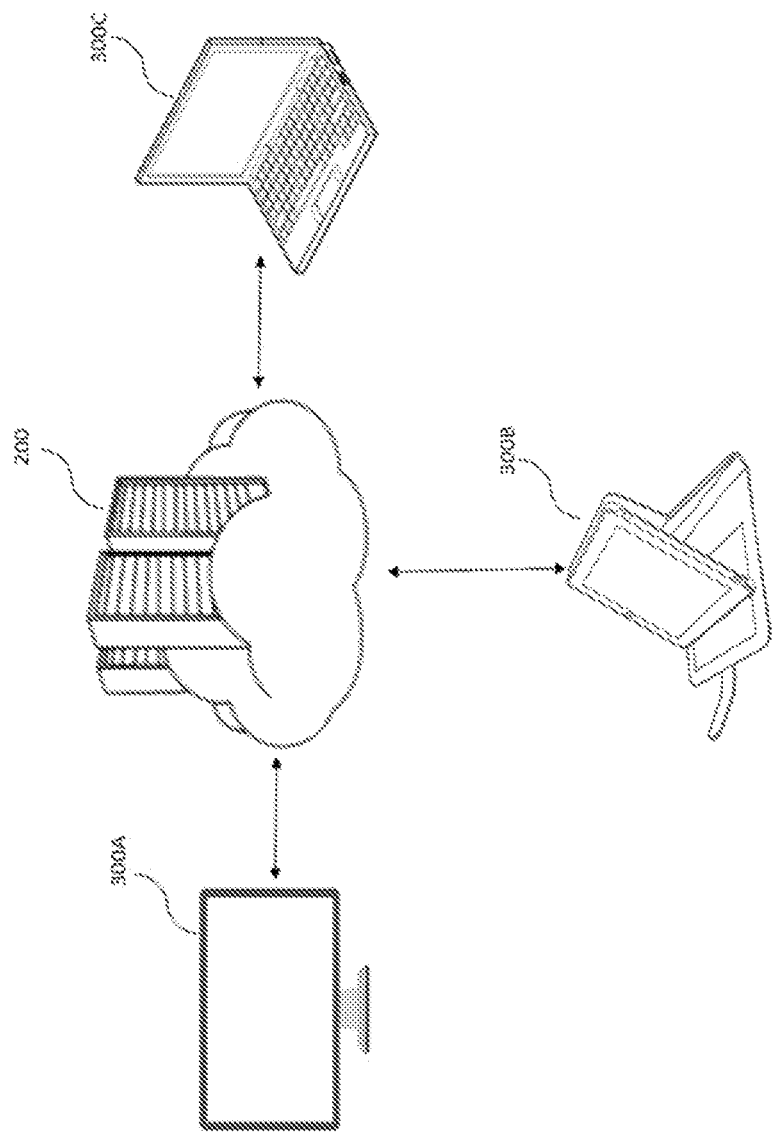
FIG. 1 is a diagram illustrating a partial configuration of a system for providing a document editing interface according to an embodiment.

Hereinafter, embodiments according to the present invention will be described with reference to the accompanying drawings. In adding reference numerals to constituent elements of each drawing, it should be noted that the same constituent elements are denoted by the same reference numeral even if they are illustrated on different drawings. In describing the embodiments of the present invention, a detailed description of pertinent known constructions or functions will be omitted if it is deemed to make the gist of the embodiments the present invention unnecessarily vague. In addition, the embodiments of the present invention will be described below, but the technical idea of the present invention is not limited thereto or is not restricted thereto, and may be variously realized by being modified by those skilled in the art.

In addition, terms used in the present specification are used only in order to describe embodiments rather than limiting or restricting the present invention. Singular forms are intended to include plural forms unless the context clearly indicates otherwise.

In the present specification, it should be understood that the term "include", "comprise", or "have" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

In addition, throughout the specification, when it is described that an element is "connected" to another element, this includes not only being "directly connected", but also being "indirectly connected" with another element in between, and terms including ordinal numbers such as first, second, and the like used in the present specification will be used only to describe various elements, and are not to be interpreted as limiting these elements.

The present invention will be described more fully hereinafter with reference to the accompanying drawings, in which embodiments of the invention are shown. In the drawings, parts irrelevant to the description are omitted in order to clearly describe the present invention.

Furthermore, the title of the invention is a method and apparatus for providing a document editing interface for providing resource information related to a document using a backlink button. For convenience of explanation, however, in the specification below, an apparatus for providing a document editing interface for providing resource information associated with a document using a backlink button is referred to as a document editing interface providing apparatus in its description. The meaning of 'clicking' throughout the document is used to refer to the user requesting an execution command for the button, and as a common term, it may refer to executing a command by clicking a mouse or using a specific key on a keyboard in a PC environment, and tapping by a user's touch consecutively or for a certain period of time in a mobile environment.

FIG. 1 is a diagram illustrating a partial configuration of a system for providing a document editing interface according to an embodiment.

Referring to FIG. 1, the system for providing a document editing interface according to an embodiment may include a document editing interface providing apparatus (200) providing a document editing interface to a user device (300), and a user device (300) for displaying on a display of the user device (300) a document editing interface received from the document editing interface providing apparatus (200), and the user device may include a plurality of user devices (300A, 300B, 300C) as illustrated in the drawing.

The document editing interface providing apparatus (200) may generate an interface on which the user may efficiently manage and edit documents and resources stored in the user device (300) or an external service (not shown) associated with the user device (300), and provide the user with the generated interface through the user device (300). A detailed description of its operation is provided below.

The document editing interface providing apparatus (200) may be implemented as a server device to generate a document editing interface and transmit the generated document editing interface to the user device (300). A server refers to a general server. The server is computer hardware on which programs are executed, and may monitor or control the entire network, such as controlling the printer or managing files, etc., or support the sharing of connections with other networks through a main frame or a public network, software resource, such as data, programs and files, or hardware resources, such as modems, fax machines, printers, and other equipment. The user device (300) may display on the display of the user device (300) a document editing interface provided by the document editing interface providing apparatus (200) using a specific program or application installed on the user device (300).

Meanwhile, FIG. 1 describes the document editing interface providing apparatus (200) as being implemented by a server to generate an interface on which the user may manage and edit documents and resources. However, the examples of the present invention are not limited to this example, and the document editing interface providing apparatus (200) may be implemented by the user device (300) for a processor included in the user device (300) to directly generate a document editing interface screen and display the generated interface screen on the display of the user device (300).

Specifically, the user device (300) includes a processing module that can generate a document editing interface screen. Thus, the processing module can generate a document editing interface screen, and provide the user with the generated screen through the display of the user device (300). Accordingly, the user may intuitively judge the relationship between documents and resources through the document editing interface, and efficiently manage the documents and resources.

The user device (300) may be implemented by various terminal devices including a processing module so that such an algorithm may be realized. For example, as shown in FIG. 1, as a PC (personal computer, 300A), a smart pad (300B) or notebook (300C), etc. Furthermore, although not shown in the drawings, the user device (300) may be implemented by all types of handheld-based wireless communication devices, such as a PDA (Personal Digital Assistant) terminal, a Wibro (Wireless Broadband Internet) terminal, a smartphone, a tablet PC, a smart watch, smart glasses, a wearable device, etc.

Figure 2:
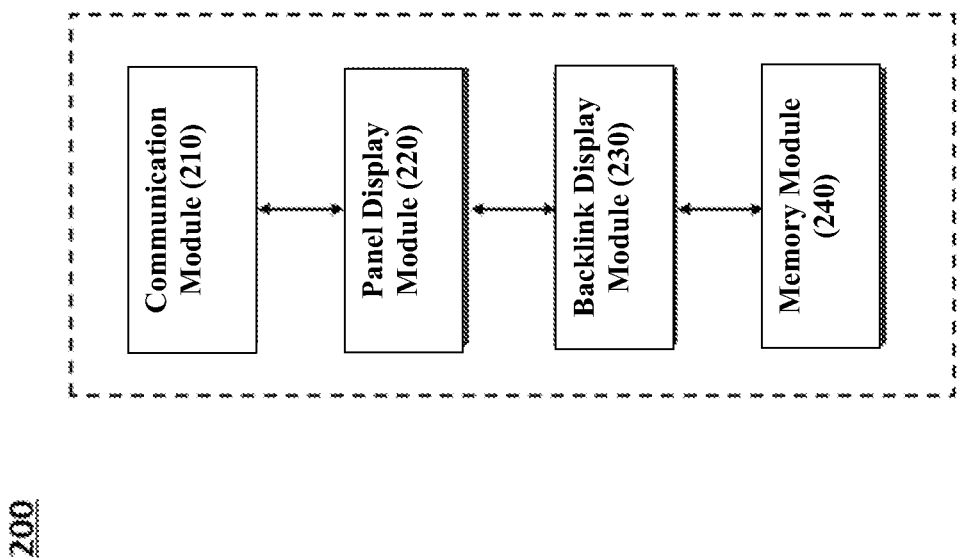
FIG. 2 is a block diagram illustrating some of the components of a document editing interface providing apparatus according to an embodiment

FIG. 2 is a block diagram illustrating some of the components of a document editing interface providing apparatus according to an embodiment.

Referring to FIG. 2, the document editing interface providing apparatus (200) according to an embodiment may include a communication module (210), a panel display module (220), a backlink display module (230) and a memory module (240). For convenience of explanation, FIG. 2 separately indicates the communication module (210), the panel display module (220) and the backlink display module (230). However, the present invention may implement the communication module (210), the panel display module (220) and the backlink display module (230) as one processing module that performs the role of a processor.

When the document editing interface providing apparatus (200) is implemented by a device, such as a server, the communication module may perform wireless communication with the user device (300), the user's document and an external server (not shown) stored therein, and transmit the document editing interface generated by the panel display module (220) and the backlink display module (230) based on data received from at least one of the user device (300) and the external server to the user device (300) to the user device (300).

As another embodiment of the present invention, when the document editing interface providing apparatus (200) is implemented by the user device, the document editing interface providing apparatus (200) may receive documents and resources previously stored by the user in the external service and store the received documents and resources in the memory module (240).

The panel display module (220) may generate various panels displayed on the display of the user device (300) and display the generated panel on the display. In the present invention, a panel refers to a portion of an interface divided according to the nature of the content displayed on the display screen. Accordingly, a plurality of panels may be generated according to the nature of the content, and the plurality of generated panels may be simultaneously displayed on the display screen. Furthermore, the size of the panel may be automatically adjusted according to the number of generated panels and may become smaller or larger based on a user's manipulation.

The panel display module (220) according to the present invention may generate panels having different characteristics and display the generated panels on the display of the user device (300). Specifically, the panel display module (220) may generate a title panel (20) on which the title of a first document to be edited by the user is displayed, a first resource panel (30) on which a first resource associated with the first document is displayed, a resource panel (40) on which an inbox resource is displayed, a second resource panel (50) on which a second document and a second resource associated with the second document are displayed, a first document editing panel (60) on which a screen for editing the content of the first document is displayed, a memo panel (70) on which a user can write specific phrases in a memo form in relation to the first document, a library panel (80) on which a resource list is displayed, a second document editing panel, a third task panel (90), etc., and display the generated panels on the display of the user device (400). The features of each panel are described below.

The backlink display module (230) is a module for generating a backlink display button (140) and a backlink information display button (150) on which information on documents associated with the first resource displayed on the first resource panel (30) is displayed. The generated buttons may be displayed on the first resource panel (30). The details of the backlink display module (230) and the panel display module (220) are described in detail in FIGS. 3 to 11.

The memory module (240) is a module in which resources and documents previously used by the user may be stored, and is a module on which data is stored that may be a database of resources and documents displayed on a workspace screen (10). When the document editing interface providing apparatus (200) is implemented by the user device (300), the memory module (240) is not included in the user device (300), and data that may be stored in the memory module (240) may be stored in an external server. Accordingly, in such case, the user device (300) may use the communication module (210) to receive documents and resources to display the document editing interface from the external server.

Figure 3:
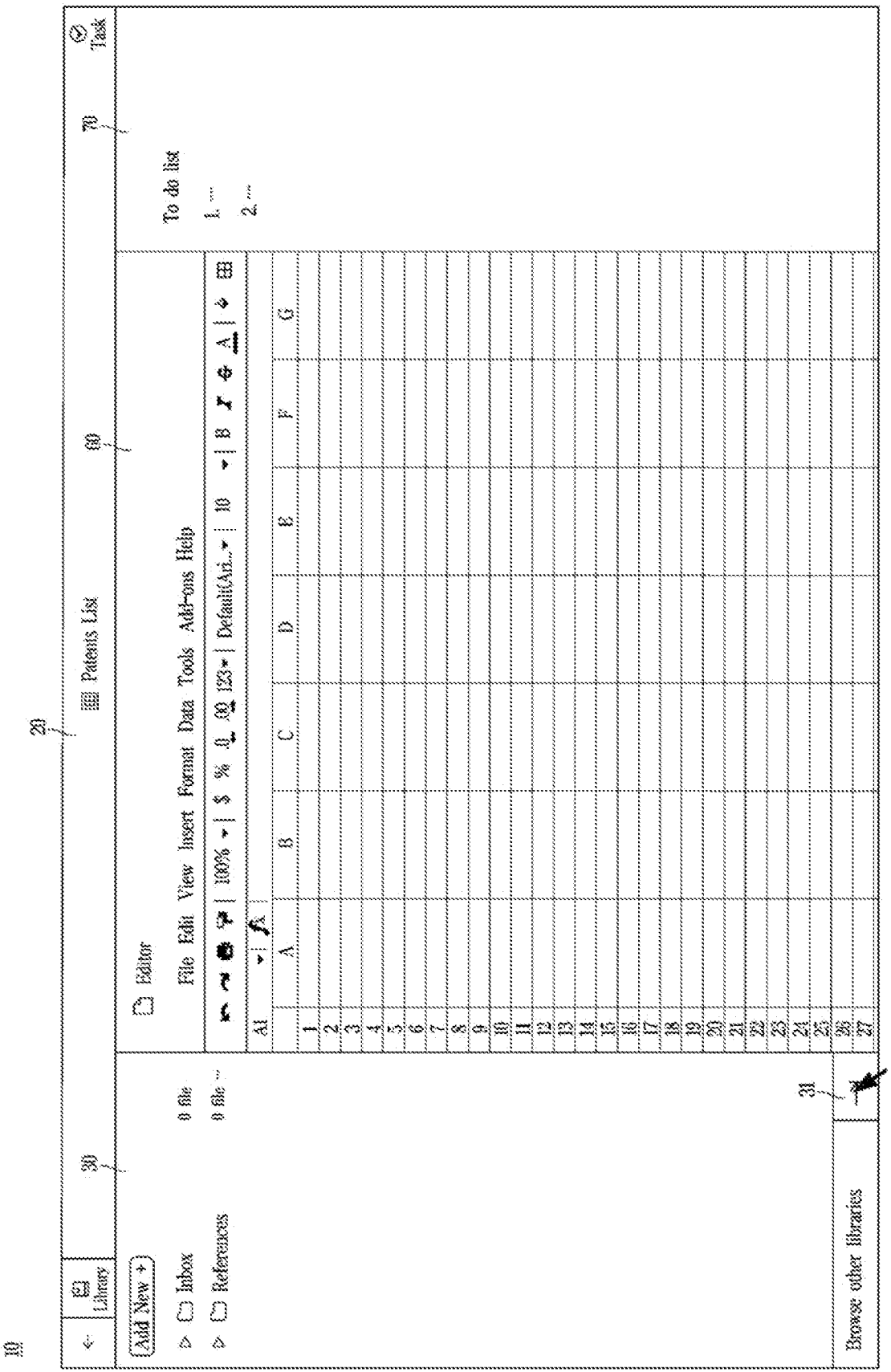
FIG. 3 is a diagram illustrating a screen displayed on a display of a user device when a document to be edited by the user is executed according to an embodiment.
Figure 4:
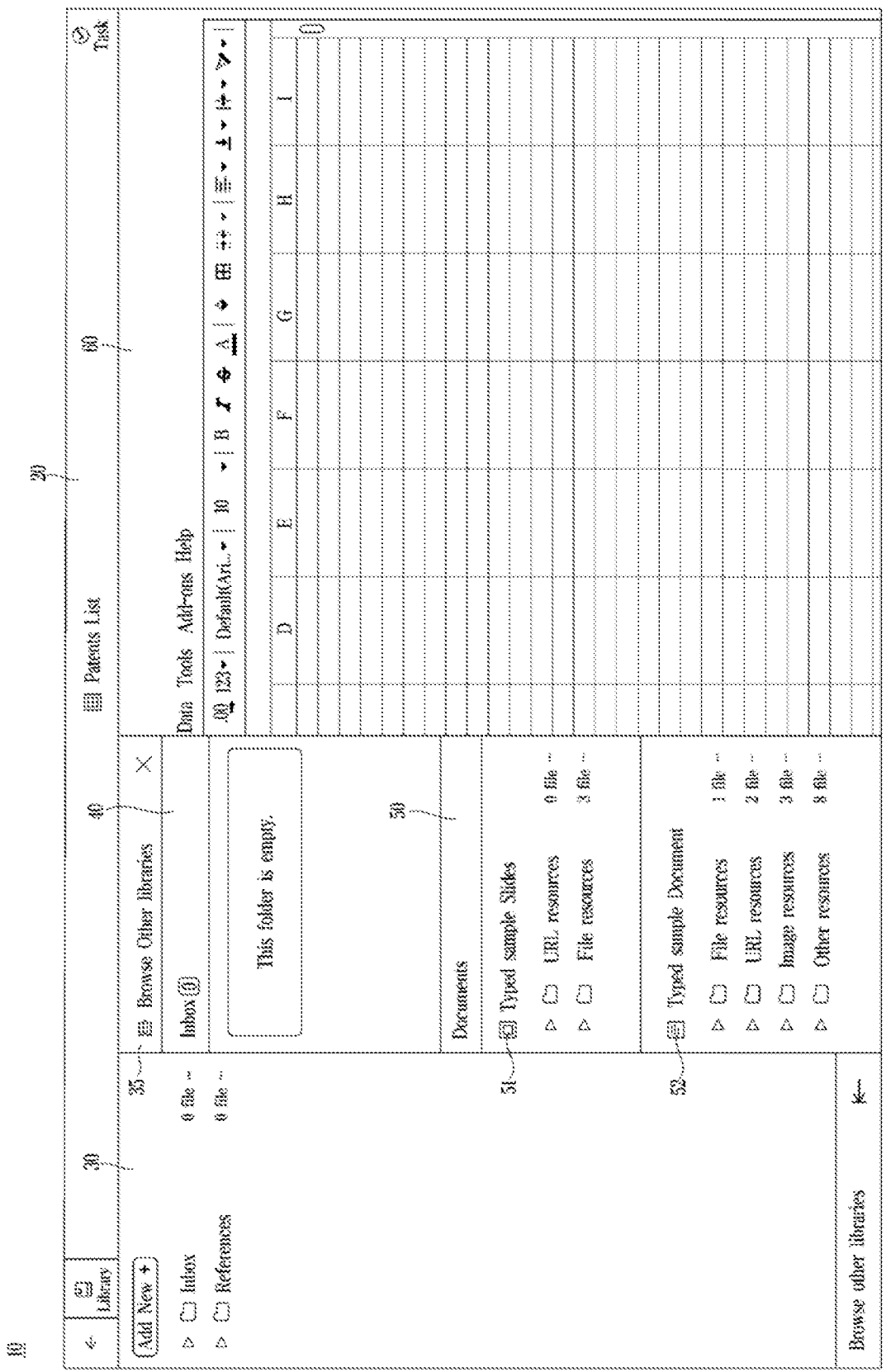
FIG. 4 is a diagram illustrating a screen displayed on a display of a user device when a user clicks a library navigation button.
Figure 5:
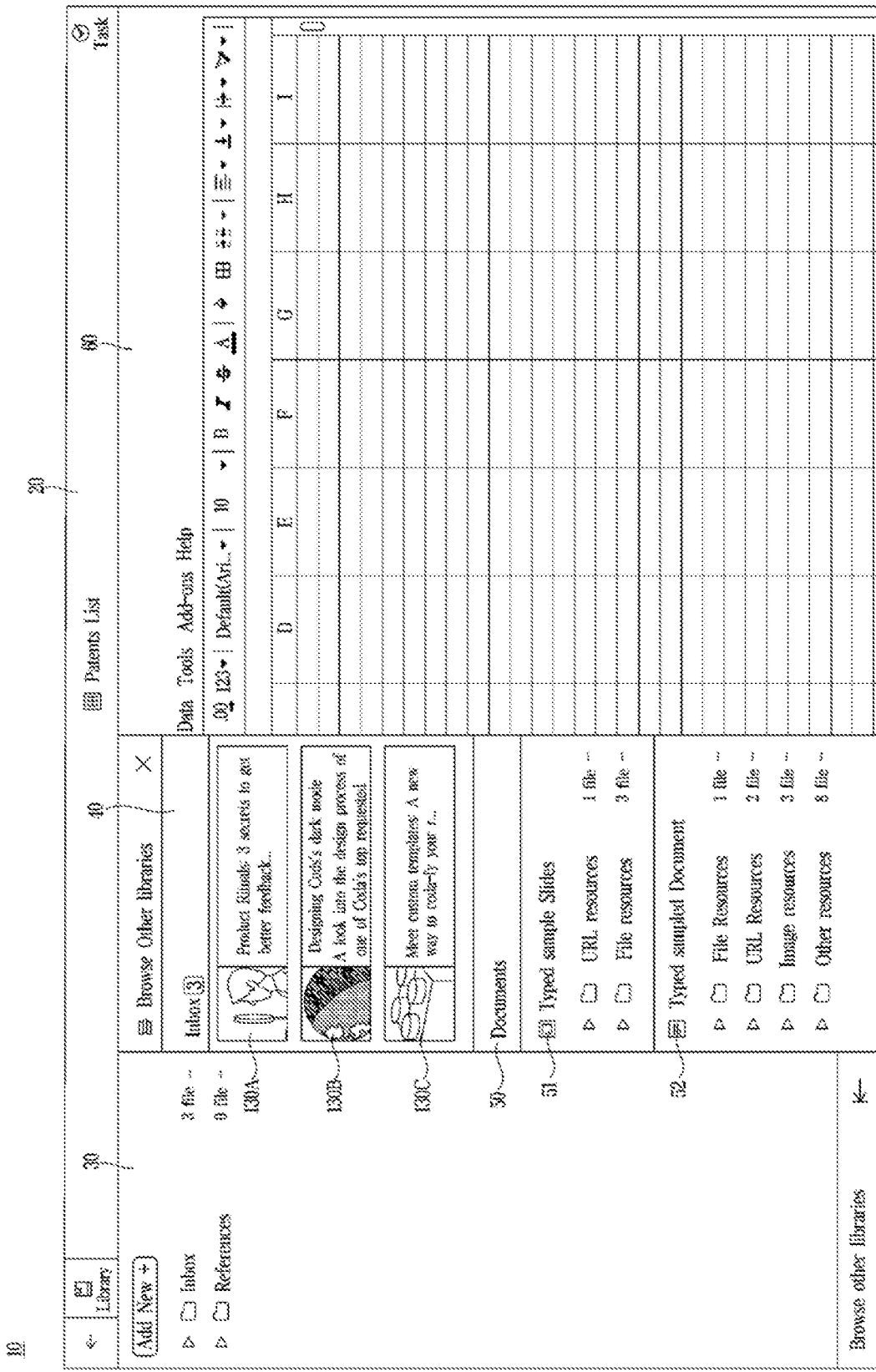
FIG. 5 is a diagram illustrating an inbox resource being stored in an inbox panel.

FIG. 3 is a diagram illustrating a screen displayed on a display of a user device when a document to be edited by the user is executed according to an embodiment. FIG. 4 is a diagram illustrating a screen displayed on a display of a user device when a user clicks a library navigation button. FIG. 5 is a diagram illustrating an inbox resource being stored in an inbox panel.

In the present invention, resources refer to data collected by a user by being determined as necessary in editing a document. Accordingly, a resource may refer to an image file, a document file, a URL link file, a PDF file, etc. However, these are exemplary, and in the present invention, all data needed in editing documents may be included within the scope of resources.

Furthermore, for convenience of explanation below, a document executed by a user to edit such a document is defined as a first document, and a resource associated with the first document is defined as a first resource (110), a resource associated with a second document displayed on a second resource panel (50) is defined as a second resource (120), and a resource displayed on an inbox panel (40) is defined as an inbox resource (130) in their descriptions.

Furthermore, throughout the specification, a user clicking a specific part or a button on an interface may refer to executing such a part or button on the interface, and copying may refer to the drag and drop action generally used in a document editing interface.

Referring to FIG. 3, when the user executes the first document, at least one of a title panel (20) on which the title of the first document is displayed, a first resource panel (30) on which a first resource associated with the first document is displayed, a first document editing panel (60) on which a screen for editing the contents of the first document is displayed and a memo panel (70) on which a user can write specific phrases in a memo form in relation to the first document may be displayed on a workspace screen (10).

On the first resource panel (30), the first resource associated with the first document may be displayed. In the present invention, a first resource (110) refers to resources determined and selected by the user as being related to the first document while editing the first document. Accordingly, a first resource (110) may include a URL link file, an image file, a document file, a PDF file, etc. as mentioned above. Currently in FIG. 1, since the user did not add any resource to the first resource panel (30), no resources are displayed on the first resource panel (30) as shown in the drawing. However, if the user determines that a specific resource is related to the first document and selects the resource to be copied on the first resource panel (30), the first resource (110) may be deemed as being associated with the first document as long as the user does not delete the resource from the first resource panel (30). Accordingly, when the user re-executes the first document, the first resource panel (30) may display the first resources that the user has associated with the first document.

The title panel (20), the first resource panel (30), the first document editing panel (60) and the memo panel (70) shown in FIG. 3 are panels associated with the first document, and may display contents related to the first document. Accordingly, when the user has executed a different type of first document, the contents displayed on the title panel (20), the first resource panel (30), the first document editing panel (60) and the memo panel (70) relate to the newly executed first document, and the contents of the first document that has been closed by the user are not displayed.

In FIG. 3, when the user clicks the library navigation button (31) below the first resource panel (30) to add a resource on the first resource panel (30), a library panel (35) including an inbox panel (40) and a second resource panel (50) may be displayed on the workspace screen (10) as shown in FIG. 4.

The inbox panel (40) is a panel displaying an inbox resource stored by the user on the inbox panel (40). The inbox panel (40) refers to a panel that is not closed when the document currently being edited by the user is closed and other documents are executed, and is displayed as is on the workspace screen (10). Accordingly, the inbox resource (130) stored on the inbox panel (40) is not closed when the document being edited by the user is closed and other documents are executed, and is displayed as is on the workspace screen (10). As an example, as shown in FIG. 5, when the user closes the first document in a state where the first inbox resource (130A), the second inbox resource (130B) and the third inbox resource (130C) corresponding to the URL file are stored on the inbox panel (40), the inbox panel (30) disappears from the workspace screen (10). Thereafter, when the user executes another first document to display the inbox panel (40) on the workspace screen (10), the three inbox resources (130A, 130B, 130C) stored by the user on the inbox panel (40) are continually displayed on the inbox panel (40).

In terms of a user editing the contents of a document, when several documents must be edited simultaneously, there are cases in which resources must be placed to be commonly associated with each of the documents. However, in the case of executing a new document according to conventional technology, there is the inconvenience of finding the resource again when the resource associated with an existing document disappears from the workspace screen. However, as in the present invention, when there is a panel on which a resource displayed on a specific panel, such as a resource panel (40), does not disappear and is always displayed on the workspace display screen (10) regardless of whether the document has been closed or not, the user can easily connect the resource to several documents, thereby having the advantage of more efficiently managing the resource and increasing the efficiency of document work.

A second resource panel (40) refers to a panel on which a second document and a second resource (120) associated with the second document are displayed.

The second document refers to a document that is different from the first document currently being edited by the user, and may refer to documents stored in the user device (400) or documents stored in an external server communicatively connected with the user device (400). A second resource (120) refers to resources determined by the user as being associated with the second document while editing the second document, and associated with the second document. Accordingly, a second resource (120) may correspond to a URL link file, an image file, a document file, a PDF file, etc. as described above. As an example, as shown in FIG. 5, when a 2-1 document (51) (Types sample Slides) and a 2-2 document (52) (Typed sample Document) are displayed as a second document displayed on the second resource panel (50), various second resources each associated with the 2-1 document (51) and the 2-2 document (52) may be separately divided into folders (may be displayed without being divided into folders) to be displayed on the second resource panel (50), and when the user selects a specific folder of the 2-2 document (52), the second resources associated with the 2-2 document (52) in the folder selected by the user may be displayed on the second resource panel (50).

Furthermore, as the second document displayed on the second resource panel (50) may be stored in the user device (400), a document stored in the user device (400) or a document selected randomly from documents stored in the external server communicatively connected to the user device (400) may be displayed. However, a document selected according to a rule preset by the user may be displayed on the second resource panel (50) with priority. As an example, a rule may be preset to consecutively display the documents that were the most recently edited by the user in chronological order, or to select another document stored in the same folder as the first document or another document that connects the same resource as the first resource associated with the first document.

Meanwhile, throughout the specification including FIGS. 3 to 5, an inbox folder in which inbox resources can be viewed and a reference folder in which resources associated with the first document can be viewed are illustrated as basic folders in the first resource panel (30) as shown in the drawings. However, only a reference folder can be displayed as a basic folder on the first resource panel (30) according to various embodiments of the present invention.

Figure 6:
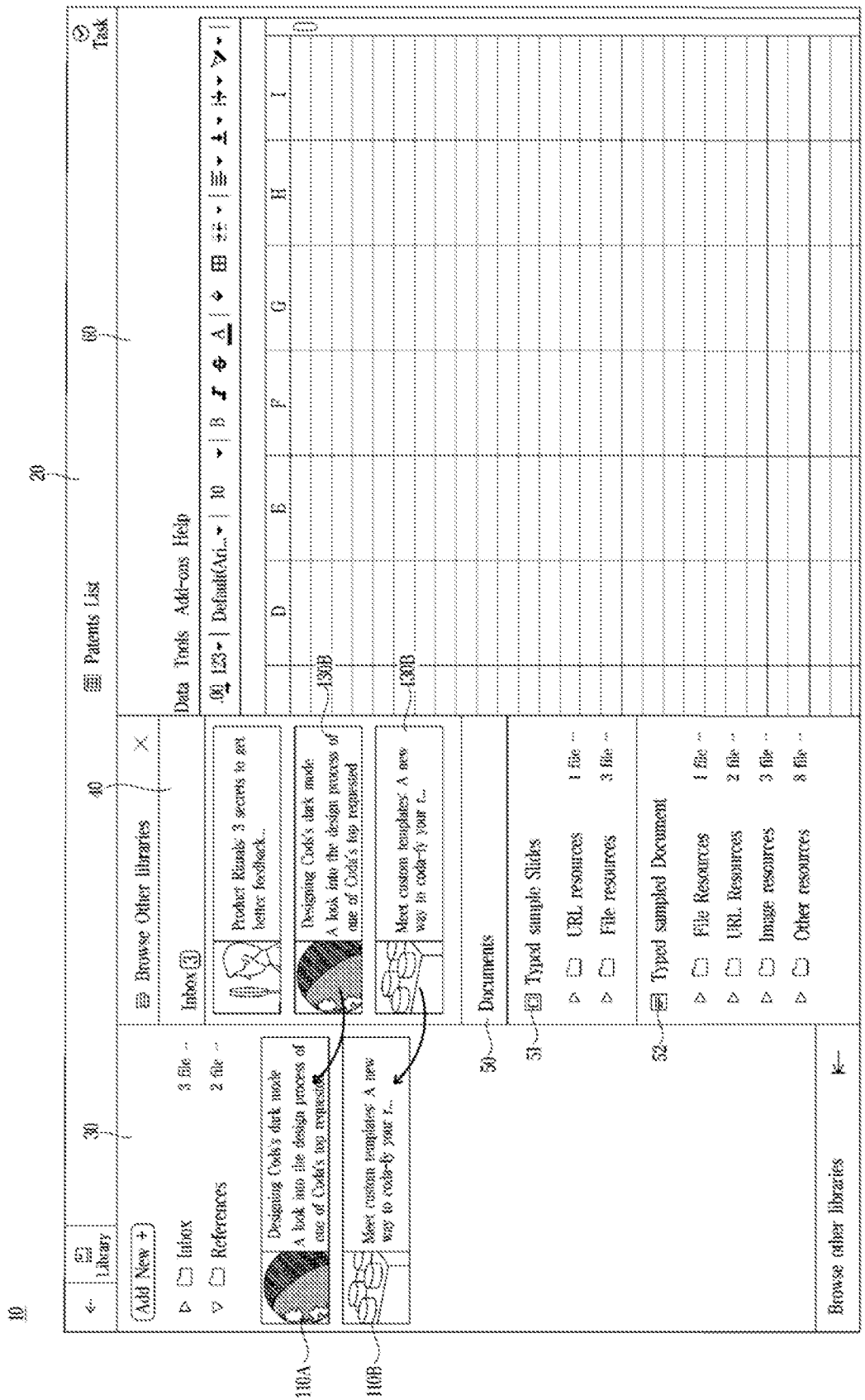
FIG. 6 is a diagram illustrating an inbox resource stored on an inbox panel being copied to the first resource panel according to an embodiment of the present invention.
Figure 7:
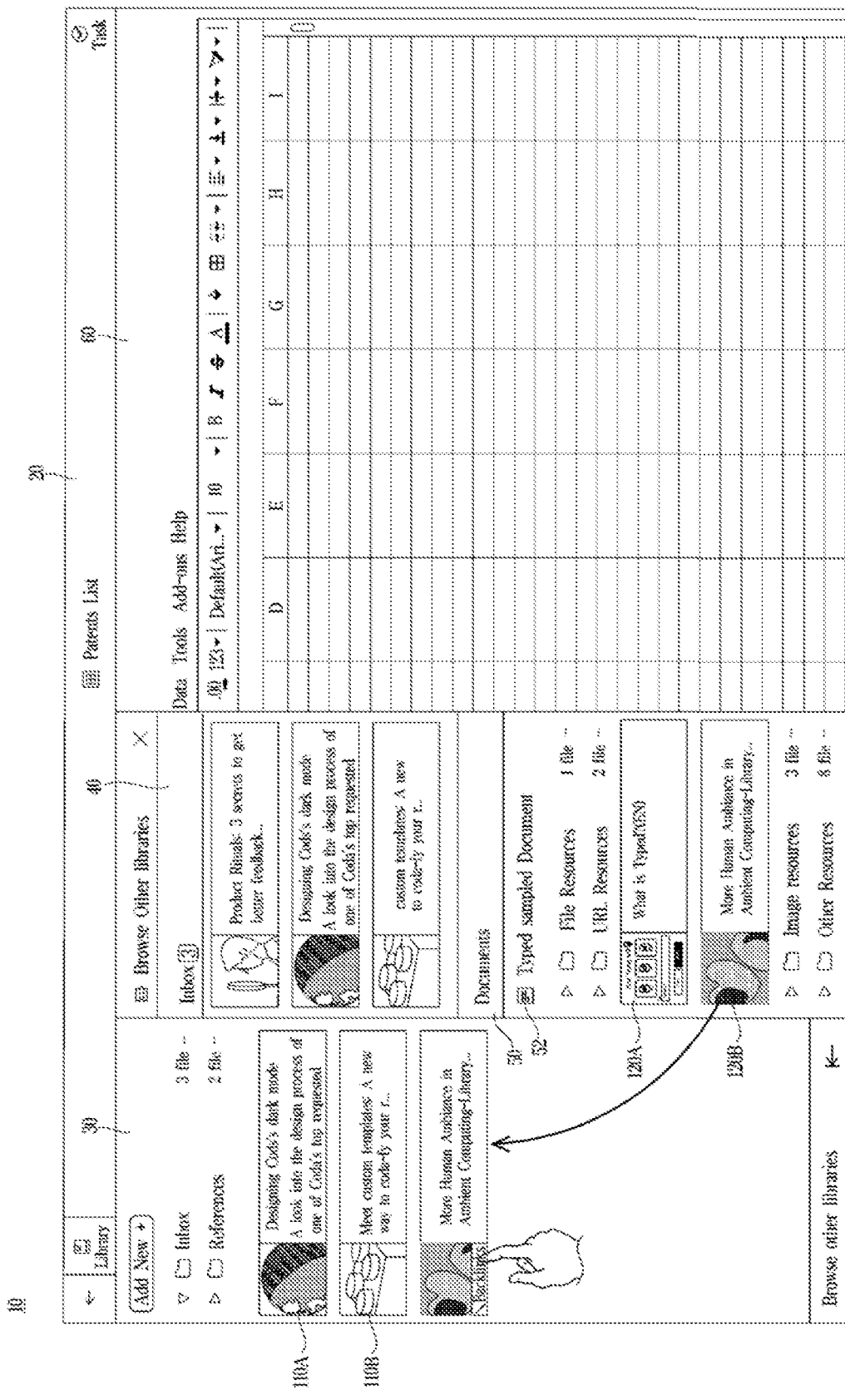
FIG. 7 is a diagram illustrating a second resource existing on the second resource panel being copied to the first resource panel according to an embodiment of the present invention.
Figure 8:
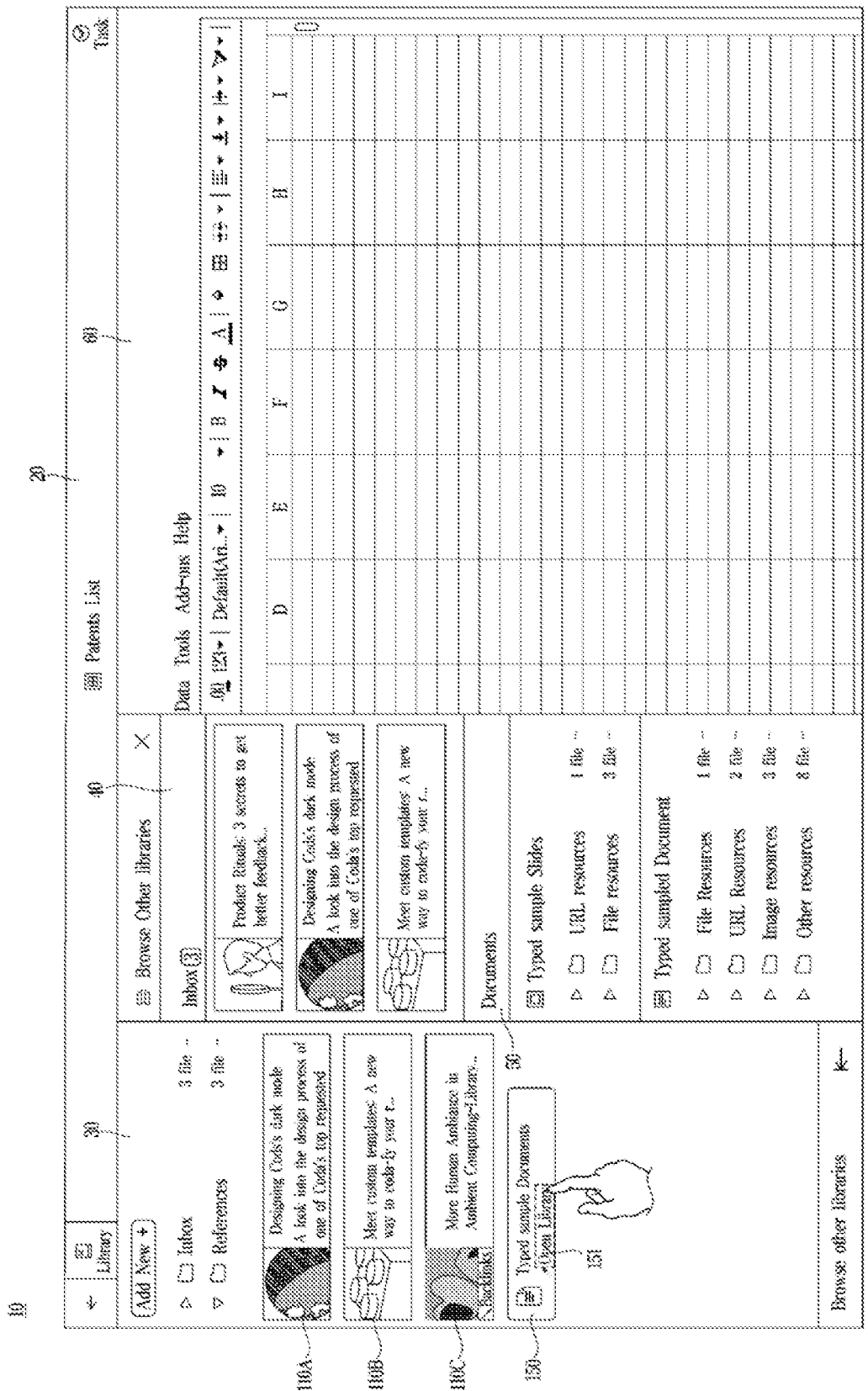
FIG. 8 is a diagram illustrating a backlink information button associated with the first resource on the first resource panel being displayed according to an embodiment of the present invention.

FIG. 6 is a diagram illustrating an inbox resource stored on an inbox panel being copied to the first resource panel according to an embodiment of the present invention. FIG. 7 is a diagram illustrating a second resource existing on the second resource panel being copied to the first resource panel according to an embodiment of the present invention. FIG. 8 is a diagram illustrating a backlink information button associated with the first resource on the first resource panel being displayed according to an embodiment of the present invention.

As shown in FIG. 6, when the first inbox resource (130A), the second inbox resource (130B) and the third inbox resource (130C) corresponding to URL files are stored as inbox resources on the inbox panel (40), the user may select at least one inbox resource existing on the inbox panel (40), and copy the selected inbox resource to the first resource panel (30).

As shown in FIG. 6, when the user has copied the second inbox resource (130A) and the third inbox resource (130C) existing on the inbox panel (40) to the first inbox panel (30), the second inbox resource (130A) and the third inbox resource (130C) have been copied to the first inbox panel (30), and thus, may be displayed on the first inbox panel (40) by being referred to as a 1-1 resource (110A) and a 1-2 resource (110B). Accordingly, the 1-1 resource (110A) and the 1-2 resource (110B) become resources associated with the first document, and when the user later re-executes the first document, the 1-1 resource (110A) and the 1-2 resource (110B) may be displayed on the first inbox panel (40).

Resources that may be stored on the first resource panel (30) are not limited to resources copied from the first inbox panel (30), and the second resources displayed on the second resource panel (50) may also be copied to the first inbox panel (30) by the user's manipulation and displayed on the first inbox panel (30). Specifically, when the user selects from the second resource (120) displayed on the second inbox panel (50) and the selected resource that has been copied to the first resource panel (30) exists, the selected resource may become a first resource (110) and displayed on the first resource panel (30). As shown in FIG. 7 as an example, when the user has selected a 2-2 resource (120B) corresponding to an URL resource from the second resource (120) associated with the 2-1 document (52) (Typed sample Document) displayed on the second resource panel (50), and copied the selected resource to the first inbox panel (40) by drag and drop, the 2-2 resource (120B) is referred to as 1-3 resource (110C) to be displayed on the first inbox panel (40). Due to this execution, the 1-3 resource (110C), which is the selected resource, becomes a resource associated with the first document, and when the user later re-executes the first document, the 1-3 resource (110C) may be displayed on the first inbox panel (40).

Furthermore, although not shown in the drawings, when the user selects and executes a specific resource from resources existing on the first resource panel (20), the inbox panel (30) and the second resource panel (30), a second document editing panel on which the contents of a specific selected resource may be edited or viewed may be displayed on the workspace screen (10). Here, the second task panel may be generated and displayed in the form of a split viewer panel. Specifically, the size of the first document editing panel (60) may be partially reduced and the second document editing panel may be displayed in the remaining reduced space, and based on such characteristic, the second document editing panel may be referred to as a split viewer panel.

Furthermore, when the first resource (110) stored on the first inbox panel (40) displays its information on the first inbox panel (30), not only is the title or thumbnail information of the resource displayed, but a backlink button (140) that allows information on the document associated with the first resource (110) to be displayed may be displayed on the first inbox panel (40) along with the first resource (110) as shown in FIG. 7. For convenience of explanation below, the document displayed along with the backlink button (140) on the first resource panel (30) is referred to as the selected document.

The backlink button (140) is a button that informs the user with information on the source of the first resource (110). When the user selects a specific resource from the first resource (110) displayed on the first resource panel (30), a backlink button (140) is displayed below the specific resource selected by the user as shown in FIG. 7, and when the user clicks the backlink button (140), information on the selected document that had been associated with the specific resource, i.e., information on which document the resource is copied from, is displayed on the first resource panel (30) as shown in FIG. 7.

As an example, when the user selects the 1-3 resource (110C) from the first resource (110) existing on the first resource panel (30), the backlink button (140) is generated at the bottom of the 1-3 resource (110C) as shown in FIG. 7, and when the user clicks the backlink button (140), a backlink information button (150) comprising the title information on a 2-2 document (42), which corresponds to the selected document that had been associated with the 1-3 resource (110C) before being copied to the first resource panel (30) is displayed on the first resource panel (30). Accordingly, the user can intuitively ascertain which document is the source of the 1-3 resource (110C) through the backlink information button (150), thereby having the advantage of efficiently managing resources and documents.

Furthermore, the present invention can intuitively displaying the title information of the selected document associated with the first resource (110) displayed on the first resource panel (30), and at the same time, providing the user with information on other resources associated with the selected document. This is explained through FIGS. 9 and 10 below.

Figure 9:
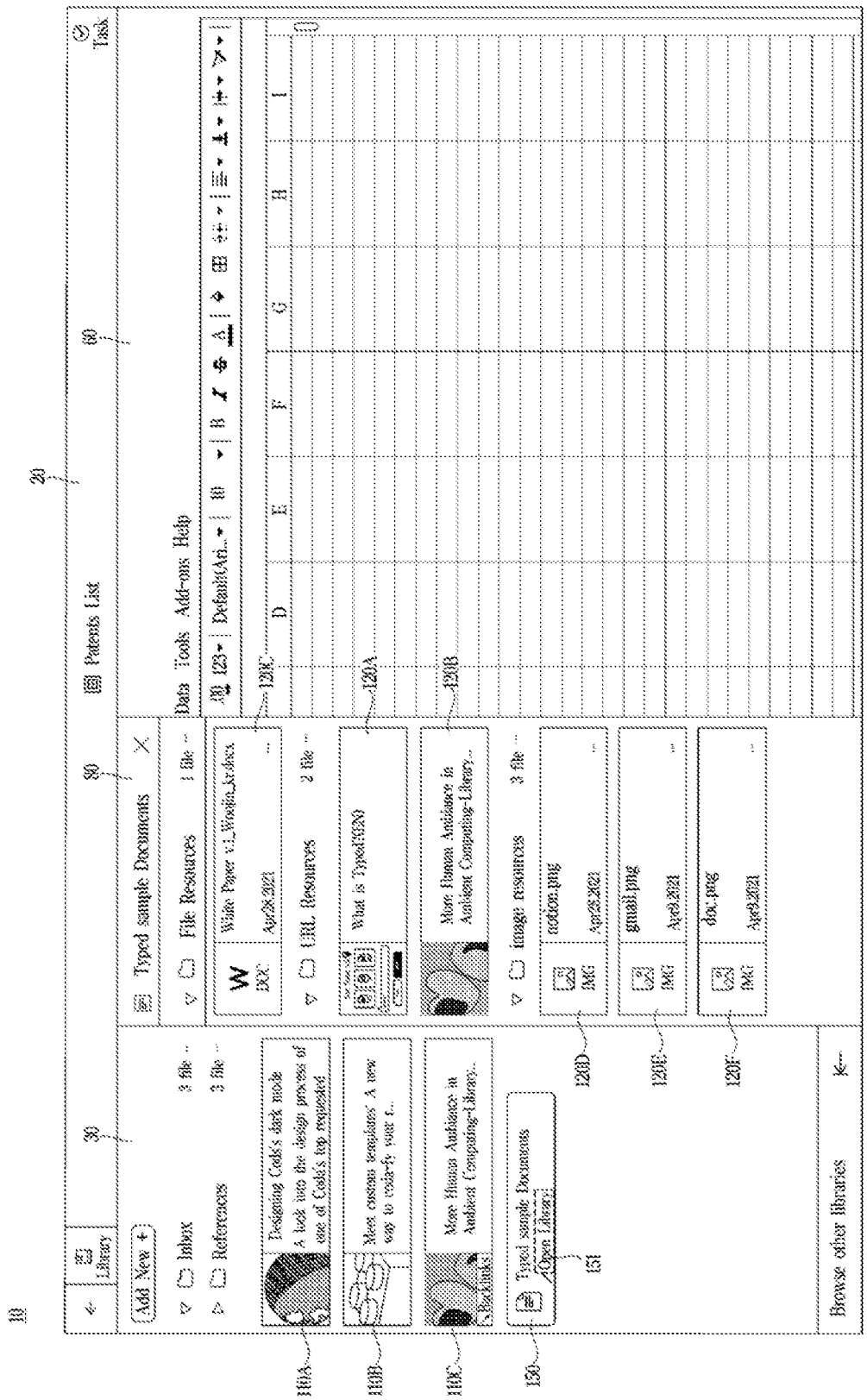
FIG. 9 is a diagram illustrating a library panel being displayed on a workspace screen according to an embodiment of the present invention.
Figure 10:
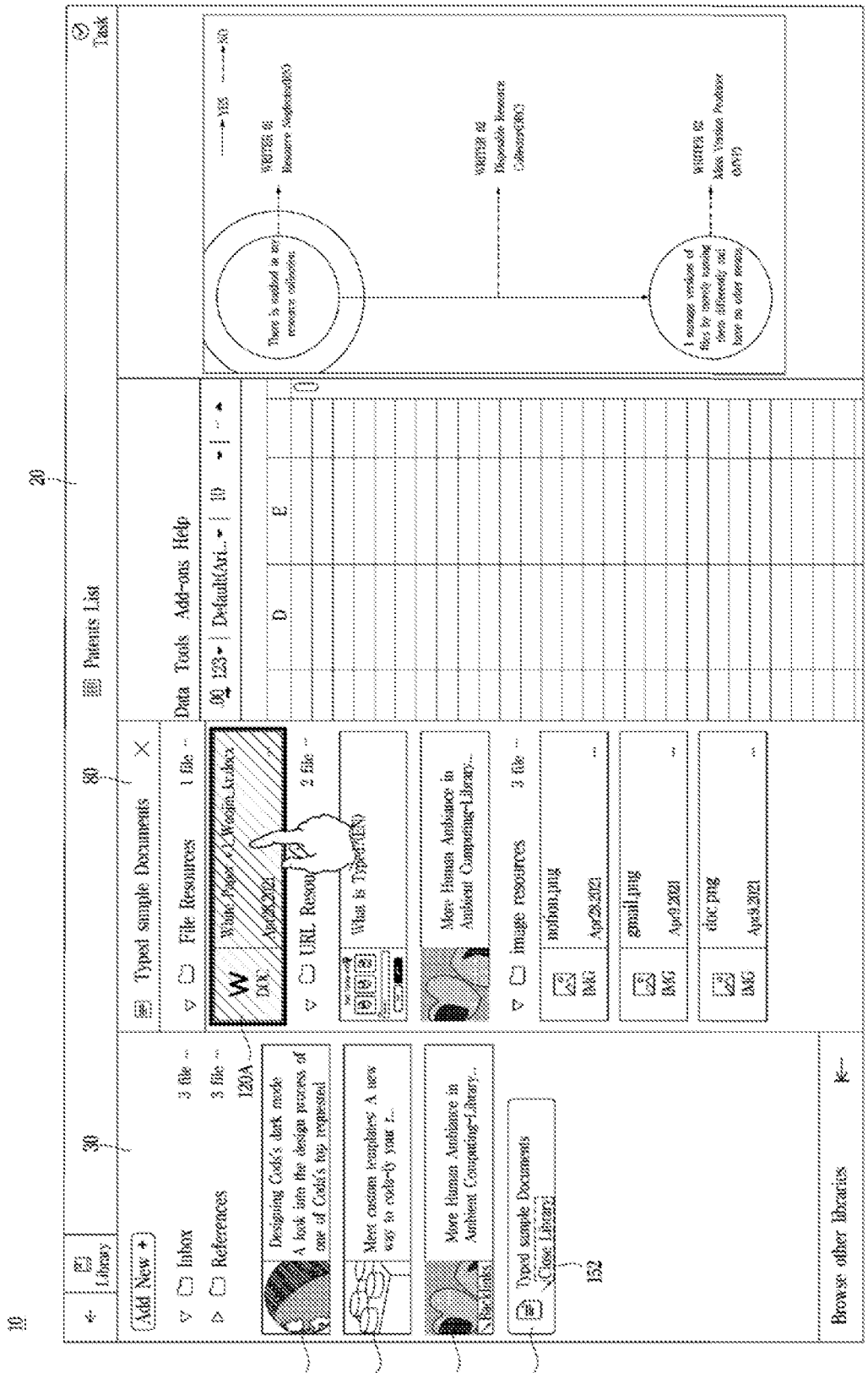
FIG. 10 is a diagram illustrating a screen on which a third document editing panel is created as a split viewer when the user executes a specific resource from the resources displayed on the library panel.

FIG. 9 is a diagram illustrating a library panel being displayed on a workspace screen according to an embodiment of the present invention. FIG. 10 is a diagram illustrating a screen on which a third document editing panel is created as a split viewer when the user executes a specific resource from the resources displayed on the library panel.

When the user clicks an open library button (151) displayed on the backlink information button (150) as shown in FIG. 8, a library panel (80) displaying a resource list comprising all resources associated with the 2-1 document (52) (Typed sample Document), which is the selected document associated with the 1-3 resource (110C), may be displayed on the workspace screen (10) as shown in FIG. 9.

The resource list refers to a list including information on all resources associated with the selected document, and as shown in FIG. 9, all resources associated with the selected document, such as the document resource, URL resource, image resource, etc. may be displayed on the resource library panel (80). Due to which, the user can intuitively ascertain information on all resources associated with the selected document associated with the selected resource selected on the first resource panel (30), thereby having the advantage of efficiently managing resources and documents. For convenience of explanation, resources displayed on the library panel (80) are referred to as third resources below.

Furthermore, in the case of the present invention, even in a situation where the first document editing panel (60) for editing the first document is displayed on the workspace screen (10), when at least one of the resources displayed on the library panel (80) is selected and executed, the third document editing panel (90) on which the contents of the selected resources may be edited or viewed may be generated as a panel in a split viewer form to be displayed on the workspace screen (10).

For example, as shown in FIG. 10, when the user has selected and executed a 3-1 resource (160A) existing on a library list panel (60), a third document editing panel (90) may be generated in the form of a split viewer on a screen on which the contents of the 3-1 resource (160A) can be viewed or edited to be displayed on the workspace screen (10). Based on which, in the process of editing the first document, the user can execute resources associated with the first document or resources determined to be related to the first document, and then edit the resources in the same manner as the first document, thereby having the advantage of collectively managing and editing documents and resources.

Furthermore, when a third document editing panel (90) is generated, the size of the first document editing panel (60) is partially reduced, and at the same time, the third document editing panel (90) may be displayed in the space left due to the reduction of the first task panel, and the size of the third document editing panel (90) may also be increased or decreased by the user's manipulation.

Figure 11:
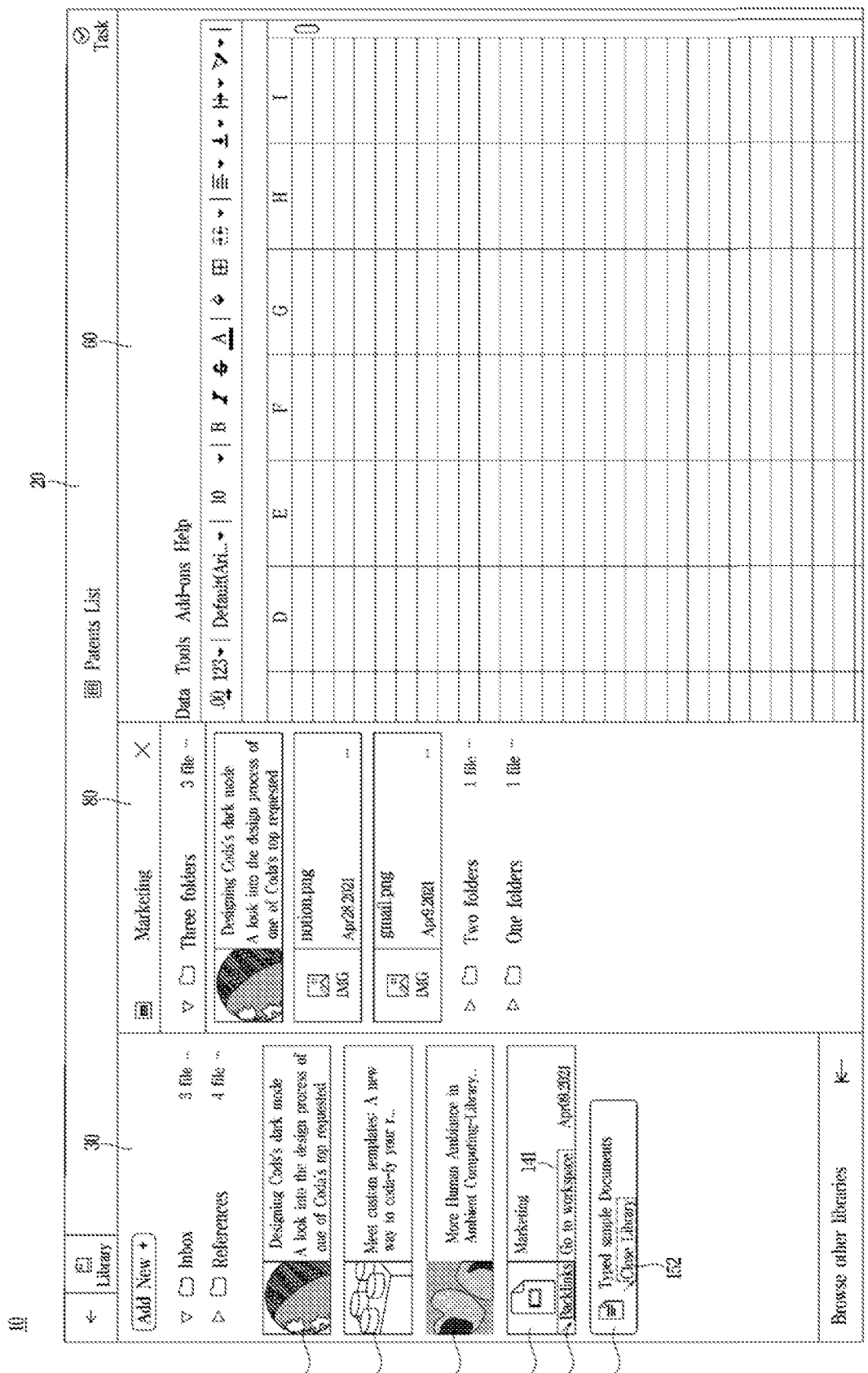
FIG. 11 is a diagram illustrating a resource being displayed on a first resource panel as an icon in the form of a card according to an embodiment of the present invention.

FIG. 11 is a diagram illustrating a resource being displayed on a first resource panel as an icon in the form of a card according to an embodiment of the present invention.

Referring to FIG. 11, when a resource corresponds to a document just as a 1-4 resource (110D) from the resources displayed on the first resource panel (30), the 1-4 resource (110D) may be displayed on the first resource panel (30) as an icon in the form of a card to express that it is a resource in the form of a document as shown in FIG. 11. That is, in terms of expressing a resource displayed on various panels of the workspace screen (10) in the present invention, when the resource is a URL link file, a thumbnail of the URL link and the title of the URL link are displayed together, when the resource is an image file, the title of the image and a thumbnail of the image are displayed together, and when the resource is a document, an icon in the form of a card that can represent the document and the title of the document is displayed, to allow the user to intuitively ascertain the form of the resource displayed on various panels, thereby facilitating easy management and editing of resources.

Furthermore, since the 1-4 resource (110D), which is a resource in the form of a document, is also displayed on the first resource panel (30), a backlink button (140) may be displayed on the 1-4 resource (110D) as shown in FIG. 11, and when the user clicks the backlink button (140), the backlink information button (150) may be displayed below the backlink button (140). Furthermore, in this situation, when the user clicks an open library button on the backlink information button (150), and a resource library panel (80) comprising resource lists associated with a document associated with the 1-4 resource (110D) may be displayed on the resource library panel (80) as shown in FIG. 11.

Furthermore, when the resource is a document just as the 1-4 resource (110D), the document corresponds to the resource that can be edited by the user. Thus, a workspace button (141), which is a button that allows a document to be directly edited, may be displayed on the backlink information button (150). The workspace button (141) is a button that may provide the user with a panel on which the corresponding resource can be edited. Although not shown in the drawings, when the user clicks the workspace button (141), the contents related to the 1-4 resource (110D) are displayed on the first document editing panel (60). Accordingly, the user may directly edit the contents of the 1-4 resource (110D) using the first document editing panel (60).

So far, a method and apparatus for providing a document editing interface for providing resource information related to a document using a backlink button according to the embodiment have been described in detail.

The method and apparatus for providing a document editing interface for providing resource information related to a document using a backlink button according to an embodiment provides an interface that allows the user to intuitively ascertain the relationship between the resource and the document associated with the resource. Thus, the user is able to more clearly ascertain the relationship between the resource and the document, thereby having the advantage of efficiently performing resource and document management.

Furthermore, the user is able to intuitively ascertain the source of a resource through a backlink system through which the original source of a resource is clearly identified, and at the same time, information related to a document associated with the resource may be easily obtained, thereby achieving the effect of reducing time and cost for the user to ascertain the source of a resource and editing a document.

On the other hand, the constitutional elements, units, modules, components, and the like stated as "~part or portion" in the present invention may be implemented together or individually as logic devices interoperable while being individual. Descriptions of different features of modules, units or the like are intended to emphasize functional embodiments different from each other and do not necessarily mean that the embodiments should be realized by individual hardware or software components. Rather, the functions related to one or more modules or units may be performed by individual hardware or software components or integrated in common or individual hardware or software components.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof.

The processes and logic flows described in this specification can be performed by one or more programmable processors executing one or more computer programs to perform functions by operating on input data and generating output.

This written description sets forth the best mode of the present invention and provides examples to describe the present invention and to enable a person of ordinary skill in the art to make and use the present invention. This written description does not limit the present invention to the specific terms set forth.

While the present invention has been shown and described with reference to certain embodiments thereof, it will be understood by those skilled in the art that various changes in forms and details may be made therein without departing from the spirit and scope of the present invention as defined by the appended claims and their equivalents. Therefore, the technical scope of the present invention may be determined by on the technical scope of the accompanying claims.

The invention claimed is:

1. A method for providing resource information associated with a document on a display of a user device using a backlink button through a processor, the method comprising:
    displaying, on the display of the user device, a workspace screen comprising a first document editing panel for editing the first document, a first resource panel on which a first resource associated with the first document is displayed, and a second resource panel on which a second document selected according to the first document and a preset rule and a second resource associated with the second document are displayed when a user executes the first document on which a resource statement is to be changed;
    displaying, on the first resource panel, a backlink button for showing information, when there is a selected resource from the second resource that has been selected by the user and moved to the first resource panel, on the selected resource and the selected document associated with the selected resource;
    displaying, on the first resource panel along with the backlink button, a selected document button comprising a title of the selected document when the user has executed the backlink button; and
    displaying, on the workspace screen, a library panel on which a library list, which is a resource list included in the selected document is displayed, when the user has executed the selected document button through the user device.

2. The method for providing resource information associated with a document using a backlink button according to claim 1, further comprising:
    generating, by the processor, a second document editing panel on which contents included in the specific resource are displayed, and
    displaying the second document editing panel on the workspace screen when the user has executed a specific resource from the first resource, the second resource, or resources included on the library list.

3. The method for providing resource information associated with a document using a backlink button according to claim 2,
    wherein the displaying the second document editing panel comprises partially reducing a size of the first document editing panel and displaying, as a panel in the form of a split viewer, the second document editing panel in the remaining space.

4. The method for providing resource information associated with a document using a backlink button according to claim 1,
wherein the displaying the workspace screen comprises displaying an inbox panel on the workspace screen and
wherein the displaying the inbox panel comprises, even when an execution of the first document has ended, or a new document is executed, continually displaying, on the workspace screen, the inbox panel and an inbox resource, which is a resource displayed on the inbox panel, without being changed.

5. The method for providing resource information associated with a document using a backlink button according to claim 1,
wherein a second document selected according to the preset rule is at least one document selected from a document associated with a resource that is identical to the first resource, a document that was previously edited by the user and a document stored in the same folder as the first document.

6. The method for providing resource information associated with a document using a backlink button according to claim 1,
wherein displaying the backlink button on the first resource panel comprises, when the selected resource corresponds to a resource document, which is a document, displaying, on the first resource panel, the selected resource as a button in the form of a card, and further comprises, when the user has commanded the execution of the button in the form of a card, generating a third document editing panel on which the contents of the resource document may be edited and displaying the third document editing panel on the workspace screen.

7. An A document editing interface providing apparatus for providing resource information associated with a document using a backlink button, the apparatus comprising:
a processor, when a user executes a first document on which a resource statement is to be changed, for displaying a workspace screen comprising a first document editing panel on which the first document may be edited, a first resource panel on which a first resource associated with the first document is displayed, and a second resource panel on which a second document selected according to the first document and a preset rule and a second resource associated with the second document are displayed; and wherein the processor, when there is a selected resource from the second resource that has been selected by the user and moved to a first resource panel, displays, on the first resource panel, a backlink button on which information on the selected resource and a selected document associated with the selected resource may be viewed; and when the user has input an execution of the backlink button, displaying, on the first resource panel, a selected document button including the selected document along with the backlink button,
wherein the processor, when the user has commanded the execution of the selected document button through the user device displays, on the workspace screen, a library panel on which a library list, which is a resource list included in the selected document is displayed.

8. A server for providing resource information associated with a document using a backlink button, the server comprising:
a processor, when a user executes a first document on which a resource statement is to be changed, for displaying a workspace screen comprising a first document editing panel on which the first document may be edited, a first resource panel on which a first resource associated with the first document is displayed, and a second resource panel on which a second document selected according to the first document and a preset rule and a second resource associated with the second document are displayed; and
wherein the processor, when there is a selected resource from the second resource that has been selected by the user and moved to a first resource panel, displays, on the first resource panel, a backlink button on which information on the selected resource and a selected document associated with the selected resource may be viewed;
and when the user has input an execution of the backlink button, displays, on the first resource panel, a selected document button including the selected document along with the backlink button,
wherein the processor, when the user has commanded the execution of the selected document button through the user device, displays, on the workspace screen, a library panel on which a library list, which is a resource list included in the selected document is displayed.

* * * * *